(12) United States Patent  (10) Patent No.: US 8,027,940 B2
Li et al.  (45) Date of Patent: *Sep. 27, 2011

(54) CLASSIFICATION OF IMAGES AS ADVERTISEMENT IMAGES OR NON-ADVERTISEMENT IMAGES

(75) Inventors: Mingjing Li, Beijing (CN); Zhiwei Li, Beijing (CN); Dongfang Li, Hefei (CN); Bin Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/945,635

(22) Filed: Nov. 12, 2010

(65) Prior Publication Data

US 2011/0058734 A1 Mar. 10, 2011

Related U.S. Application Data

(63) Continuation of application No. 11/762,553, filed on Jun. 13, 2007, now Pat. No. 7,840,502.

(51) Int. Cl.
*G06F 15/18* (2006.01)
(52) U.S. Cl. .......................................... 706/12
(58) Field of Classification Search ...................... 706/12
See application file for complete search history.

(56) References Cited

U.S. PATENT DOCUMENTS

| | | | |
|---|---|---|---|
| 5,870,151 A | 2/1999 | Korber | |
| 6,025,349 A | 2/2000 | Schwark et al. | |
| 6,813,395 B1 | 11/2004 | Kinjo | |
| 7,099,510 B2 | 8/2006 | Jones et al. | |
| 7,433,895 B2 | 10/2008 | Li et al. | |
| 2004/0066966 A1 | 4/2004 | Schneiderman | |
| 2006/0045337 A1 | 3/2006 | Shilman et al. | |
| 2006/0253491 A1 | 11/2006 | Gokturk et al. | |
| 2007/0073749 A1 | 3/2007 | Fan | |
| 2008/0019661 A1 | 1/2008 | Obrador et al. | |
| 2008/0107341 A1* | 5/2008 | Lu | 382/190 |

FOREIGN PATENT DOCUMENTS

WO  WO-2007028166  3/2007

OTHER PUBLICATIONS

Shin et al. "Classification of Document Page Images Based on Visual Similarity of Layout Structures", SPIE, DRR VII, 2000, No. of pp. 9.*

(Continued)

*Primary Examiner* — Jeffrey A Gaffin
*Assistant Examiner* — Li-Wu Chang
(74) *Attorney, Agent, or Firm* — Perkins Coie LLP

(57) ABSTRACT

An advertisement image classification system trains a binary classifier to classify images as advertisement images or non-advertisement images and then uses the binary classifier to classify images of web pages as advertisement images or non-advertisement images. During a training phase, the classification system generates training data of feature vectors representing the images and labels indicating whether an image is an advertisement image or a non-advertisement image. The classification system trains a binary classifier to classify images using training data. During a classification phase, the classification system inputs a web page with an image and generates a feature vector for the image. The classification system then applies the trained binary classifier to the feature vector to generate a score indicating whether the image is an advertisement image or a non-advertisement image.

20 Claims, 8 Drawing Sheets

OTHER PUBLICATIONS

Kushmerick "Learning to remove Internet advertisements", 3rd Int. Conf. on Autonomous Agents, 1999, pp. 175-181.*

Eglin et al. "Document page similarity based on layout visual saliency: Application to query by example and document classification", ICDAR'03, No. of pp. 5.*

Fu et al. "Detecting Phishing Web Pages with Visual Similarity Assessment Based on Earth Mover's Distance (EMD)", IEEE Transactions on Dependable and Secure Computing, vol. 3, No. 4, Oct.-Dec. 2006, pp. 301-311.*

Tu, Zhouwen, et al., "Image Parsing: Unifying Segmentation, Detection, and Recognition," Proceedings of the Ninth IEEE International Conference on Computer Vision (ICCV 2003), 2003 (8 pages).

Covell, Michele and Baluja, Shumeet, "Advertisement Detection and Replacement Using Acoustic and Visual Repetition," IEEE Workshop on Multimedia Signal Processing, Victoria, BC, Oct. 2006 (6 pages).

Paek, Seungyup, "Detecting Image Purpose in World-Wide Web Documents," Proc. SPIE vol. 3305, Apr. 1998 (8 pages).

Kushmerick, N., "Learning to Remove Internet Advertisements," 3rd Int. Conf. on Autonomous Agents, 1999, pp. 1-7.

* cited by examiner

(12)  United States Patent
US 8,027,940 B2

CLASSIFICATION OF IMAGES AS ADVERTISEMENT IMAGES OR NON-ADVERTISEMENT IMAGES

CROSS REFERENCE TO RELATED APPLICATION

This application is a continuation application of U.S. patent application Ser. No. 11/762,553, filed on Jun. 13, 2007, and entitled "CLASSIFICATION OF IMAGES AS ADVERTISEMENT IMAGES OR NON-ADVERTISEMENT IMAGES," issued as U.S. Pat. No. 7,840,502, which is incorporated herein in its entirety by reference.

BACKGROUND

Many providers of web sites rely on online advertisements as a source of revenue. The providers may rely on third-party advertisement servers to supply the advertisements that are included on the web pages of their web site. When a web page is generated, advertisement space may be allocated on the web page with a hyperlink that references the advertisement server. When the web page is displayed by a browser, the browser resolves the hyperlink by sending a request to the advertisement server. The advertisement server identifies an appropriate advertisement and returns to the browser the advertisement, which may include a link to a web page relating to what is being advertised. The browser then displays the advertisement as part of the web page. The provider of the web page may be compensated for the advertisement when a user selects the hyperlink of the advertisement.

To improve the chances of increasing revenue, a provider of web pages may crowd the web pages with advertisements. The crowding of web pages with advertisements may, however, have negative consequences. For example, mobile devices, such as handheld personal computers, cell phones, and personal digital assistants ("PDAs"), are becoming increasingly popular ways to access the Internet. Unfortunately, the experience of users in accessing web pages with many advertisements using these mobile devices has been less than satisfactory. First, because these mobile devices have small display areas, it is difficult to effectively display in such a small display area a web page with many advertisements. Second, because these mobile devices typically have a relatively slow communications link (e.g., via a cell phone network), it can take an unacceptably long time to download an accessed web page that is crowded with advertisements. Third, because the mobile devices have limited computing power, the rendering of a web page crowded with advertisements can also take an unacceptably long time.

As another example, many search engine services provide for searching for images that are accessible via web pages. These search engine services allow users to search for images that may be of interest to users. After a user submits a search request (i.e., a query) that includes search terms, the search engine service identifies images that may be related to those search terms. To quickly identify related images, the search engine services may maintain a mapping or index of keywords to images. This mapping may be generated by "crawling" the web (i.e., the World Wide Web) to identify the keywords of web pages that contain the images. To crawl the web, a search engine service may use a list of root web pages to identify all web pages that are accessible through those root web pages. Whenever the search engine service identifies an image on a web page, it adds the image to the mapping. Since many of the images of web pages are images that are part of advertisements, the mapping will contain images of advertisements, which are typically not of interest to users searching for images. When there are a significant number of images of advertisements, it takes longer for the search engine service to generate the mapping, the mapping consumes more system resources, it takes longer to access the mapping, and the search results may contain many images of advertisements, which are not of interest to the user.

SUMMARY

Identification of images of display pages as advertisement images or non-advertisement images is provided. An advertisement image classification system trains a binary classifier to classify images as advertisement images or non-advertisement images and then uses the binary classifier to classify images of display pages, such as web pages, as advertisement images or non-advertisement images. During a training phase, the classification system collects web pages with images and identifies the images of the web pages. The classification system then inputs a label for each image indicating whether the image is an advertisement image or a non-advertisement image. The classification system then generates a feature vector for each image containing features derived from the image and its web page. The classification system trains a binary classifier to classify images using training data that includes the feature vectors and labels of the images. During a classification phase, the classification system inputs a web page with an image and generates a feature vector for the image. The classification system then applies the trained binary classifier to the feature vector to generate a score indicating whether the image is an advertisement image or a non-advertisement image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
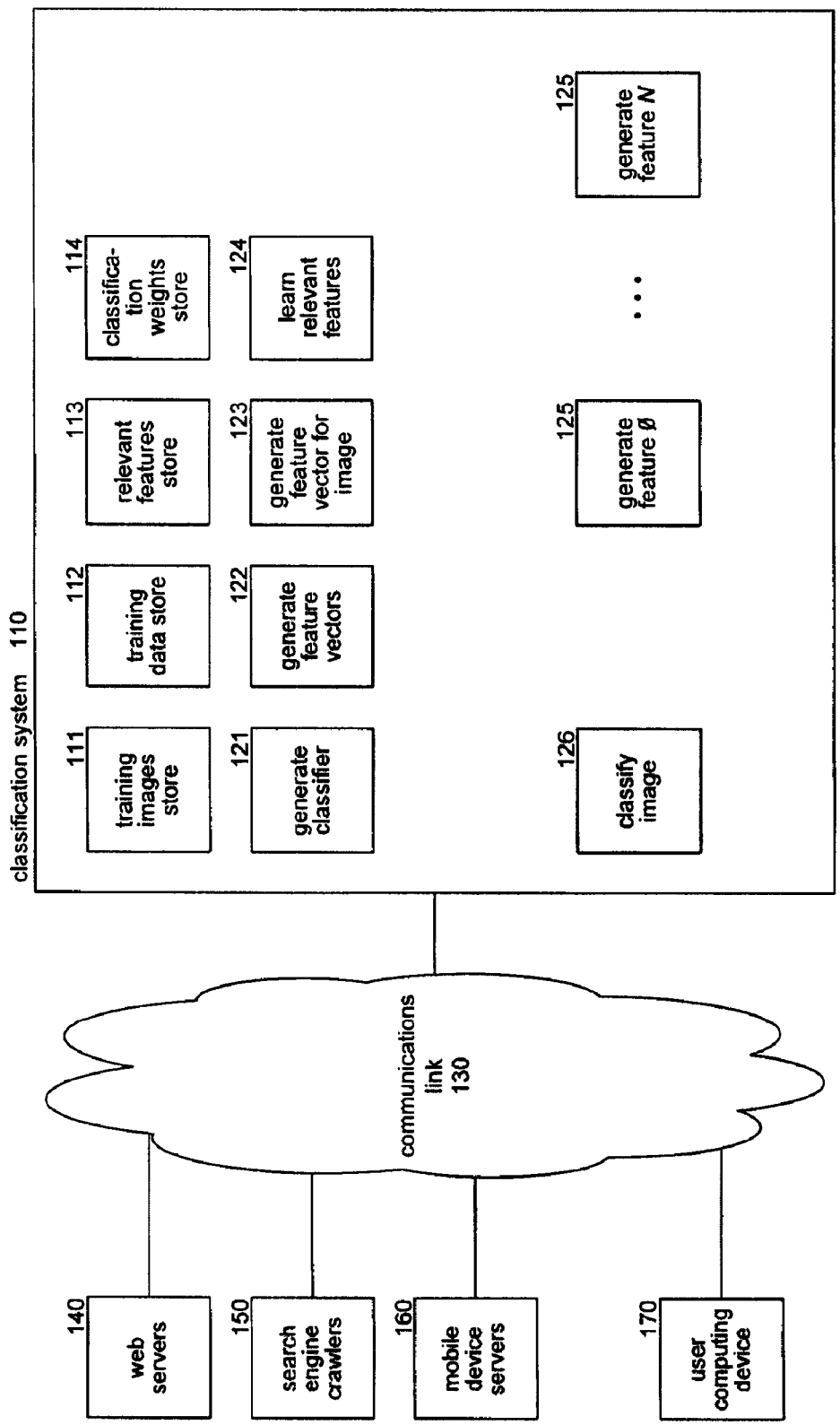
FIG. 1 is a block diagram that illustrates components of the classification system in one embodiment.

Identification of images of display pages as advertisement images or non-advertisement images is provided. In some embodiments, an advertisement image classification system trains a binary classifier to classify images as advertisement images or non-advertisement images and then uses the binary classifier to classify images of display pages, such as web pages, as advertisement images or non-advertisement images. During a training phase, the classification system collects web pages with images and identifies the images of the web pages. The classification system then inputs a label for each image indicating whether the image is an advertisement image or a non-advertisement image. The classification system then generates a feature vector for each image containing features derived from the image and its web page. For example, the features may include the size of the image, the left and top coordinates of the image on its web page, the number of images of its web page with the same left coordinate, the height of the image, and so on. The classification system trains a binary classifier to classify images using training data that includes the feature vectors and labels of the images. The classification system may use various techniques to train the binary classifier, such as support vector machine techniques, neural network techniques, Bayesian techniques, and so on. The binary classifier may be represented by feature weights indicating the weight given each feature when classifying an image. During a classification phase, the classification system inputs a web page with an image and generates a feature vector for the image. The classification system then applies the weights of the binary classifier to the feature vector to generate a score indicating whether the image is an advertisement image or a non-advertisement image. The binary classifier can be used by an image search engine service to identify advertisement images and discard those images before they are added to a mapping of images. The binary classifier can also be used by a server that supports mobile devices to identify and discard advertisement images from web pages before the web pages are provided to the mobile devices.

In some embodiments, the classification system identifies features that are relevant to the classification of images as advertisement images or non-advertisement images during a feature identification phase. The classification system may then use the relevant features during the training phase. To identify relevant features, the classification system selects candidate features from which the relevant features are to be identified. The classification system generates the training data, including the feature vectors and their labels, for the feature identification phase in a manner similar to that described above for the training phase. One difference, however, may be that the feature vectors used in the feature identification phase include all the candidate features, whereas the feature vectors used in the training phase include only the candidate features that are determined to be relevant. For example, the candidate features may include a feature indicating whether metadata of the image contains the word "advertisement" and another feature indicating the size of the image. During the feature identification phase, the classification system may determine that the feature relating to the metadata is not relevant but that the feature relating to size is relevant. Thus, the relevant features are a subset of the candidate features. If the classification system uses the same web pages in both the feature identification phase and the training phase, then the classification system can generate the feature vectors for the training phase by copying the relevant features from the feature vectors generated during the feature identification phase.

The classification system then uses an adaptive boosting technique to train, using the feature vectors of candidate features and the labels, a classifier to classify images as advertisement images or non-advertisement images. The adaptive boosting technique generates a weak classifier for each candidate feature and learns a weight for each weak classifier. The adaptive boosting technique learns the weights based on misclassification of the training data. The classification system then selects as relevant features the candidate features of the weak classifiers whose weights indicate that they are relevant to the classification of images as advertisement images or non-advertisement images. For example, the classification system may select the candidate features of those weak classifiers that are weighted most heavily.

In some embodiments, the classification system categorizes candidate features as text features, link features, visual layout features, or content features. A text feature is a word derived from a web page (e.g., the URL of the image, ALT string of the image, or text surrounding the image) that may indicate that the word is an advertisement. Such words may include "pop-up" and "advertisement."

Link features are derived from the sites to which links associated with an image point. One link feature indicates whether the hyperlink identifying an image points to the same web site that provided the web page or to a different location, which may be an advertisement server. Such a hyperlink that points to a different location may be pointing to an advertisement server and thus may indicate that the image is an advertisement. Another link feature indicates whether the hyperlink associated with the image points to the same web site that provided the web pages or to a different location, which may be a web page through which an advertised item may be purchased. Such a hyperlink that points to a different location may be pointing to a web page of an advertiser and thus may indicate that the image is an advertisement.

A visual layout feature relates to how an image is visually laid out within its web page. The visual layout features may include the leftmost coordinate of the image, the height of the image, the number of images of its web page with the same leftmost coordinate, and so on. The various features may be normalized to the width and height of the web pages. For example, the X-coordinates and the Y-coordinates of a web page may range between 0 and 1.

The content features relate to the content of the image itself. The content features may include aspect ratio of the image, image format, whether the image is a photograph or a graphic, size of the image, number of different colors of the image, percentage of gray area of the image, and an indication of whether the image has high contrast. The aspect ratio feature may be useful in identifying banner advertisements, which are short and wide. The image format feature may be useful in identifying advertisement images that may have a format with multiple frames. The photograph/graphic feature may be useful because many advertisement images are graphics that incorporate the information of the advertisement. The size feature may be useful because advertisement images need to be large enough to be noticed. The number of colors feature may be useful because advertisement images generally have fewer different colors than a non-advertisement image. The percentage of gray feature may be useful because advertisement images often have varying shades of gray as a background. The contrast feature may be useful because advertisement images are manually created to have sharp contrast.

The following table lists candidate features that were identified as being relevant in one embodiment. The rank indicates the ranking of the weights assigned to the weak classifier for the feature during the feature identification phase. C1 represents a text feature, C2 represents a link feature, C3 represents a visual layout feature, and C4 represents a content feature.

| Rank | Category | Feature Description |
| --- | --- | --- |
| 1 | C4 | Size of the image |
| 2 | C3 | X-coordinate of right side of the image |
| 3 | C3 | Width of the image |
| 4 | C1 | Number of words in the advertisement that are also in the image URL |
| 5 | C3 | Y-coordinate of the top of the image |
| 6 | C3 | Y-coordinate of the image center |
| 7 | C4 | Contrast of the image |
| 8 | C4 | Whether the image is a photograph or graphic |
| 9 | C3 | X-coordinate of center of the image |
| 10 | C4 | Percentage of gray of the image |
| 11 | C1 | Number of words in the advertisement that are also in the URL associated with the image |
| 12 | C3 | X-coordinate of left side of the image. |
| 13 | C3 | Number of images with the same X-coordinate as the image |
| 14 | C3 | Number of images with the same X-coordinate and width as the image |
| 15 | C3 | Y-coordinate of the bottom of the image |
| 16 | C3 | Number of images with same dimensions as the image |
| 17 | C3 | Height of the image |
| 18 | C3 | Number of images with the same Y-coordinate and height as the image |
| 19 | C2 | Whether the image URL point to a site outside the serving site |
| 20 | C2 | Whether the image has a hyperlink that points to a site outside the serving site |

As described above, an adaptive boosting technique may be used to identify those candidate features that are relevant to the classification of an image as an advertisement image or a non-advertisement image. Adaptive boosting is an iterative process that runs multiple tests on a collection of training data having examples. Adaptive boosting transforms a weak learning algorithm (an algorithm that performs at a level only slightly better than chance) into a strong learning algorithm (an algorithm that displays a low error rate). The weak learning algorithm may run on different subsets of the training data. The algorithm concentrates more and more on those examples in which its predecessors tended to show mistakes. The algorithm corrects the errors made by earlier weak learning algorithms. The algorithm is adaptive because it adjusts to the error rates of its predecessors. Adaptive boosting combines rough and moderately inaccurate rules of thumb to create a high-performance algorithm. Adaptive boosting combines the results of each separately run test into a single, very accurate classifier or ranking function.

As described above, the classification may use a support vector machine to train the binary classifier using the features that were identified as being relevant. A support vector machine operates by finding a hyper-surface in the space of possible inputs. The hyper-surface attempts to split the positive examples (e.g., feature vectors for advertisement image labels) from the negative examples (e.g., feature vectors with non-advertisement labels) by maximizing the distance between the nearest of the positive and negative examples to the hyper-surface. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at http://research.microsoft.com/~platt/smo.html.)

FIG. 1 is a block diagram that illustrates components of the classification system in one embodiment. The classification system 110 is connected to web servers 140, search engine crawlers 150, mobile device servers 160, and user computing devices 187 via communications link 130. The web servers serve web pages that are crawled by the search engine crawlers and accessed by the user computing devices. The mobile device servers serve web pages to mobile devices. The classification system includes a training images store 111, a training data store 112, a relevant features store 113, and a classification weights store 114. The training images store contains web pages with images used for training the binary classifier. The training data store contains feature vectors and labels for the images of the training images store. The feature vectors may include all the candidate features. The relevant features store contains an indication of those candidate features that are determined to be relevant during the feature identification phase. The classification weights store contains the weights representing the trained binary classifier.

The classification system also includes a generate classifier component 121, a generate feature vectors component 122, a generate feature vector for image component 123, a learn relevant features component 124, and various generate feature components 125. The generate classifier component invokes the generate feature vectors component to generate feature vectors for the images of the training images store. The generate feature vectors component invokes the generate feature vector for image component to generate a feature vector for an image. The generate feature vector for image component invokes the generate feature components to generate the features of the feature vector. The generate classifier component then trains the binary classifier to learn the classification weights. The generate classifier component may also invoke the learn relevant features component to identify the relevant features from the candidate features using an adaptive boosting technique.

The classification system also includes a classify image component 126 to classify images of web pages as being advertisement images or non-advertisement images. The classify image component invokes the generate feature vector for image component to generate the feature vector for an image to be classified. The classify image component then applies the classification weights to the feature vector to classify the image.

The computing device on which the classification system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the classification system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The classification system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the feature identification phase, the training phase, and the classification phase may be performed on different computing systems. The binary classifier may be distributed to various search engine services, mobile-device servers, or other computing devices that may need to identify advertisement images.

Figure 2:
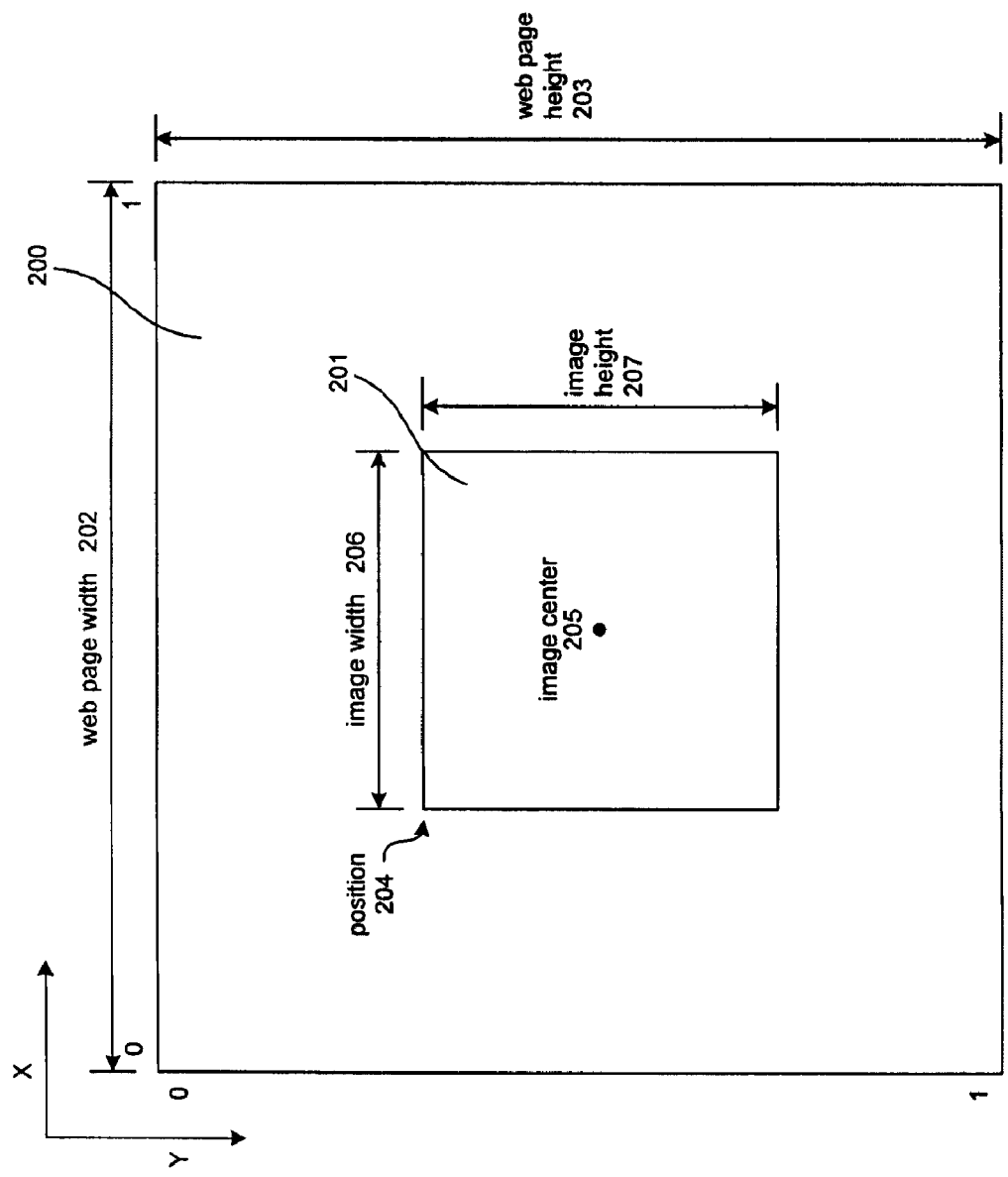
FIG. 2 is a block diagram that illustrates factors used in generating visual layout features in some embodiments.

FIG. 2 is a block diagram that illustrates, factors used in generating visual layout features in some embodiments. Web page 200 includes an image 201. The web page has a normalized web page width 202 of 1 and a normalized web page height 203 of 1. The X-coordinates and the Y-coordinates vary between 0 and 1. The position 204 of the image is represented by the X-coordinate and Y-coordinate of the upper-left corner of the image. The image center 205 is represented by the X-coordinate and the Y-coordinate of the center point of the image. The image width 206 and the image height 207 are normalized to the web page's width and height.

Figure 3:
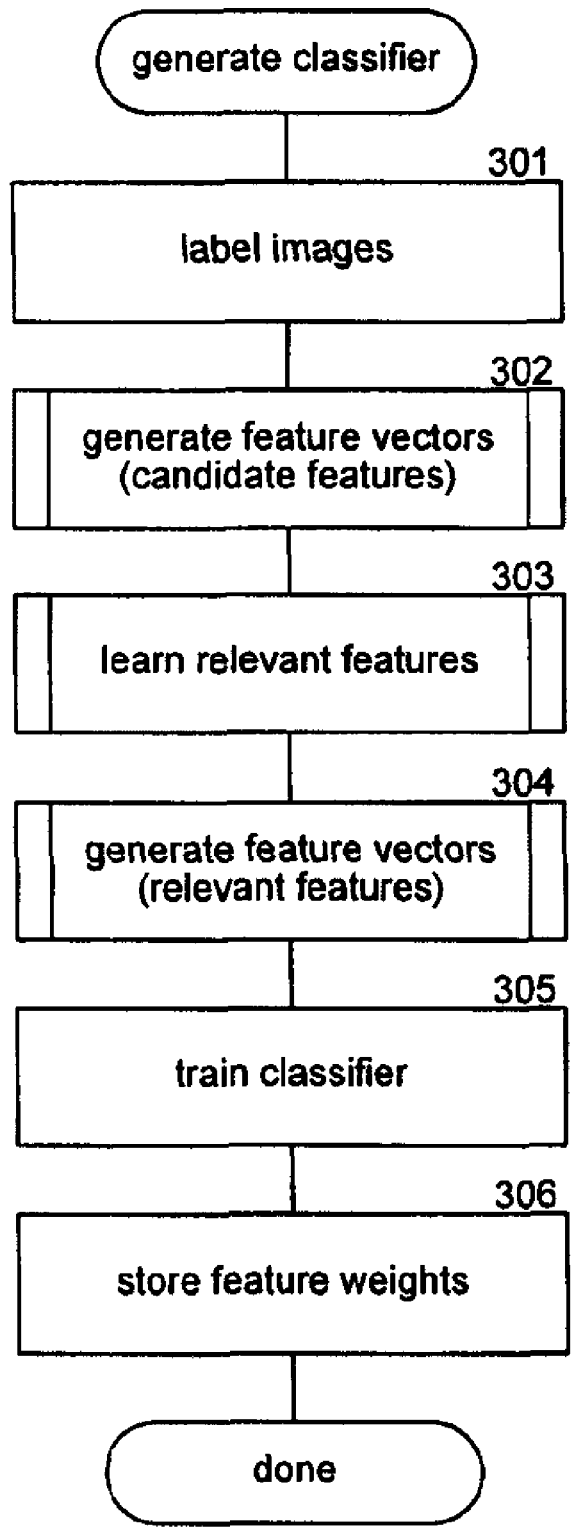
FIG. 3 is a flow diagram that illustrates the processing of the generate classifier component of the classification system in some embodiments.

FIG. 3 is a flow diagram that illustrates the processing of the generate classifier component of the classification system in some embodiments. The generate classifier component may optionally learn the relevant features from candidate features during a feature identification phase prior to performing the training phase. During the training phase, the component trains a binary classifier using training data that includes feature vectors of relevant features and labels. In block 301, the component labels the images of the training images store as being advertisement images or non-advertisement images. In block 302, the component invokes the generate feature vectors component passing the candidate features to generate the feature vectors for all the images. In block 303, the component invokes the learn relevant features component to learn which of the candidate features are relevant. In block 304, the component invokes the generate feature vectors component to generate feature vectors of the relevant features for the images. One skilled in the art will appreciate that the relevant features can be extracted from the feature vectors that include the candidate features since the relevant features are a subset of the candidate features (assuming the same images are used during the feature identification phase and the training phase). In block 305, the component trains a binary classifier using the feature vectors of relevant features and the labels using a support vector machine algorithm or some other machine learning algorithm. In block 306, the component stores the learned weights of the features in the classification weights store and then completes.

Figure 4:
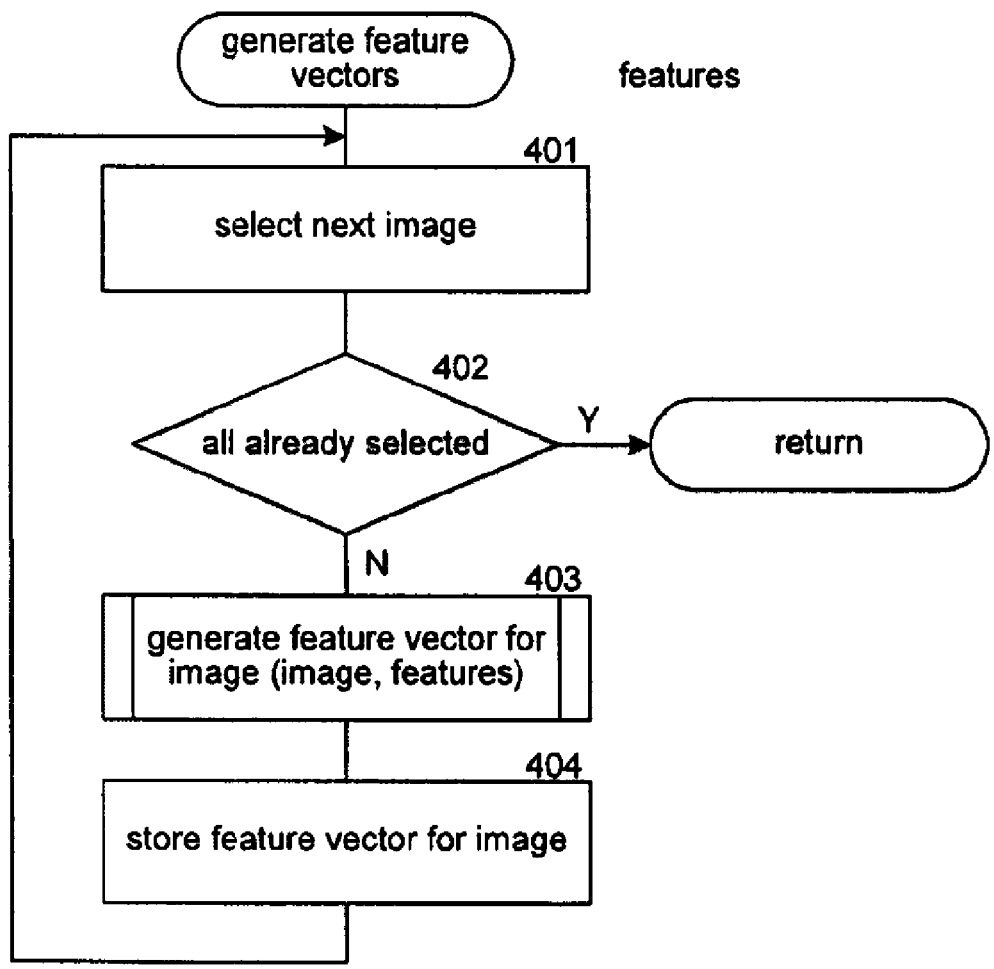
FIG. 4 is a flow diagram that illustrates the processing of the generate feature vectors component of the classification system in some embodiments.

FIG. 4 is a flow diagram that illustrates the processing of the generate feature vectors component of the classification system in some embodiments. The component is passed a list of features (e.g., candidate features or relevant features) and generates a feature vector for each image that contains those features. In block 401, the component selects the next image of the training images store. In decision block 402, if all the images have already been selected, then the component returns, else the component continues at block 403. In block 403, the component invokes the generate feature vector for image component passing the selected image and features to generate the feature vector for the selected image. In block 404, the component stores the feature vector for the image in the training data store and then loops to block 401 to select the next image.

Figure 5:
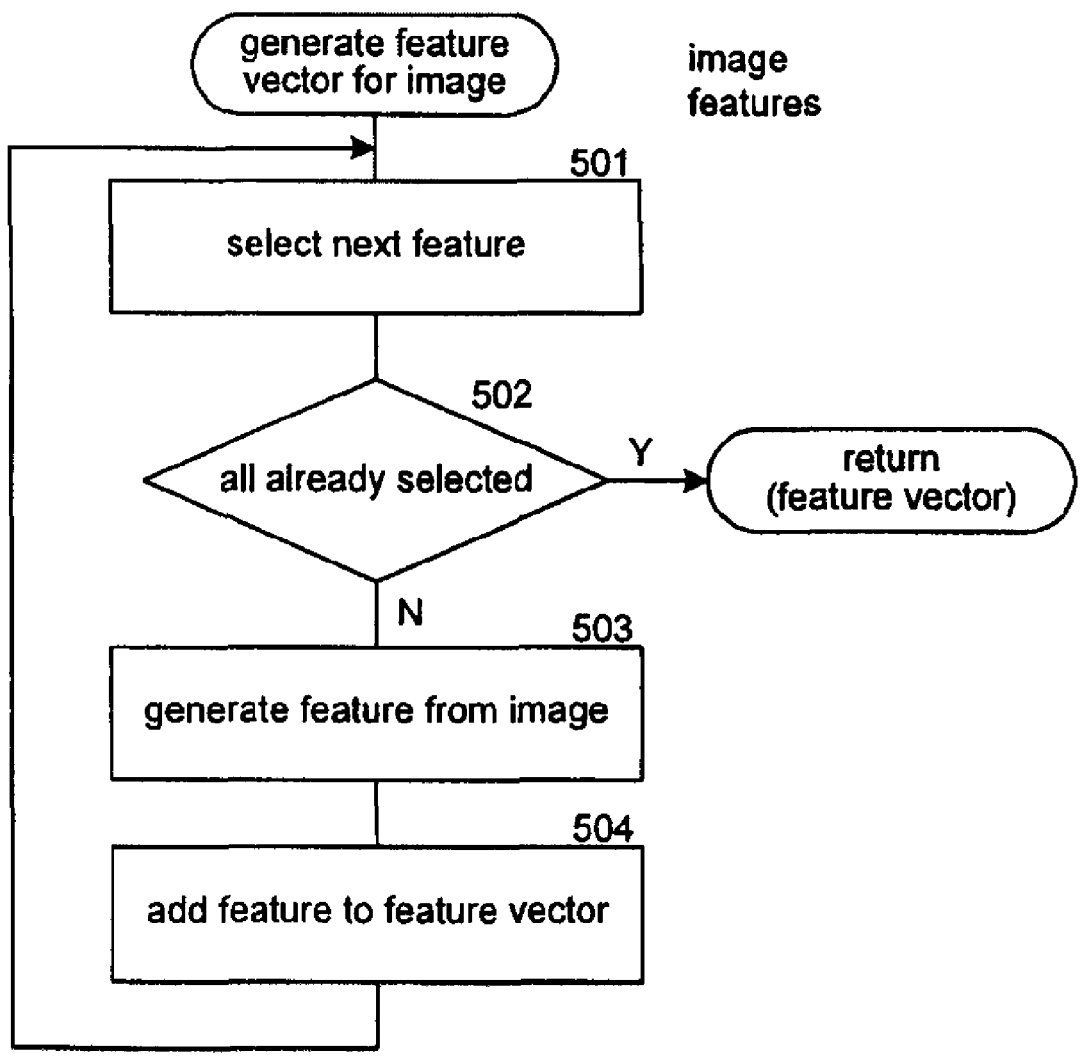
FIG. 5 is a flow diagram that illustrates the processing of the generate feature vector for image component of the classification system in some embodiments.

FIG. 5 is a flow diagram that illustrates the processing of the generate feature vector for image component of the classification system in some embodiments. The component is passed an image and a list of features. The component generates a feature vector for the image that contains the passed features. In block 501, the component selects the next passed feature. In decision block 502, if all the features have already been selected, then the component returns the feature vector, else the component continues at block 503. In block 503, the component generates the selected feature for the image by invoking the appropriate generate feature component. In block 504, the component adds the generated feature to the feature vector for the image and then loops to block 501 to select the next feature.

Figure 6:
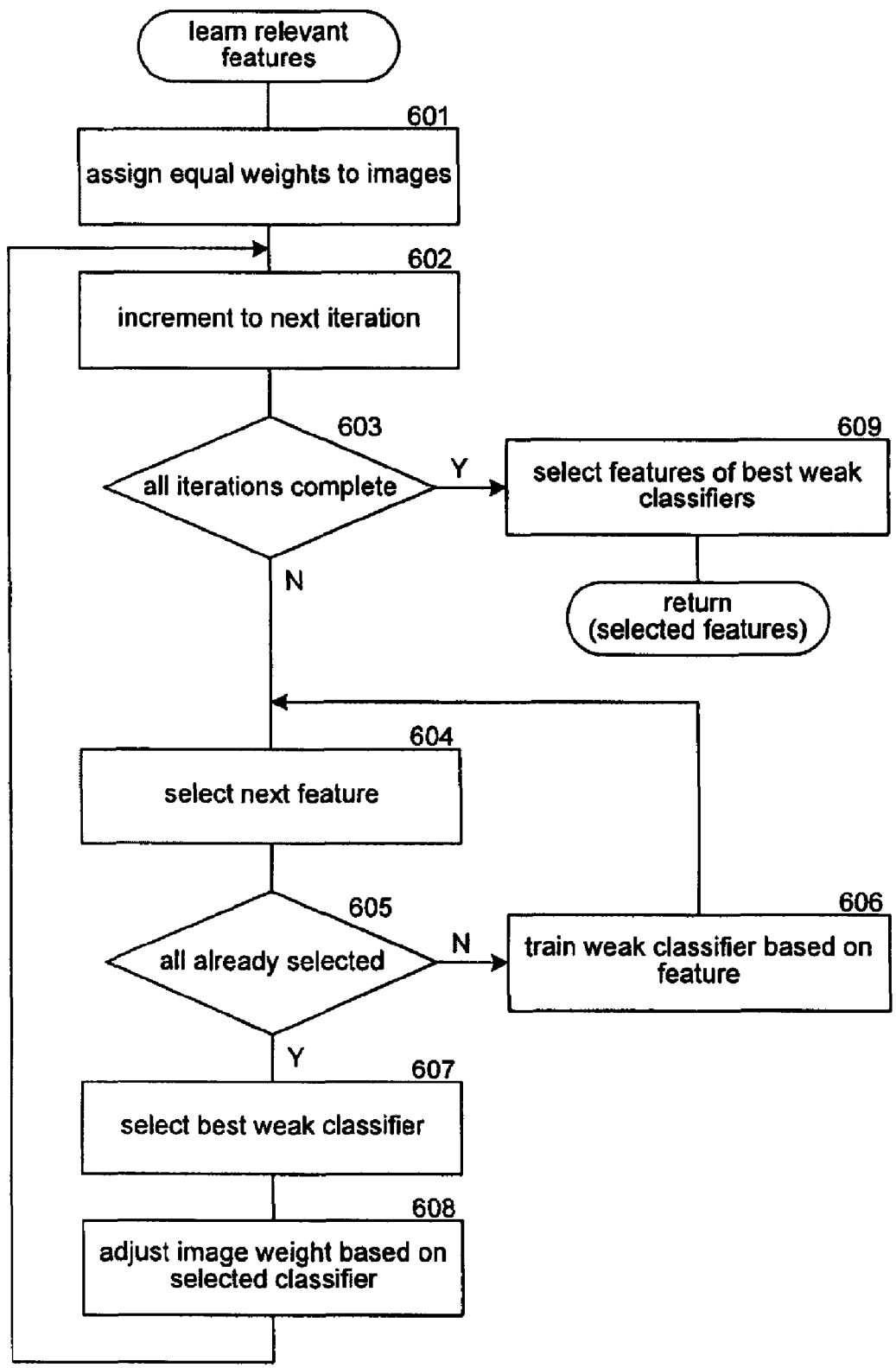
FIG. 6 is a flow diagram that illustrates the processing of the learn relevant features component of the classification system in some embodiments.

FIG. 6 is a flow diagram that illustrates the processing of the learn relevant features component of the classification system in some embodiments. The component identifies relevant features using the training data of the training data store and stores an indication of the relevant features in the relevant features store. The component identifies those candidate features that are relevant to classifying an image as an advertisement image or a non-advertisement image. In block 601, the component assigns equal weights to the images. During the adaptive boosting process, the weights of the images are adjusted so that the training can focus on those images that are misclassified based on the weights of the weak classifiers. In blocks 602-608, the component loops determining the weights of the weak classifiers and adjusting the weights for misclassified images. In block 602, the component increments to the next iteration. In decision block 603, if all the iterations are complete, then the component continues at block 609, else the component continues at block 604. In blocks 604-606, the component loops training a weak classifier for each feature. In block 604, the component selects the next feature. In decision block 605, if all the features have already been selected, then the component continues at block 607, else the component continues at block 606. In block 606, the component trains the weak classifier for the selected feature using the weights of the images. The component then loops to block 604 to select the next feature. In block 607, the component selects the best weak classifier, that is, the weak classifier with the fewest misclassifications. In block 608, the component adjusts the weights of the images based on the misclassifications of the selected weak classifier. The weights of misclassified images are increased relative to the weights of the correctly classified images. The component then loops to block 602 to increment to the next iteration. In block 609, the component selects the features of the best weak classifiers and then returns the selected features as the relevant features.

Figure 7:
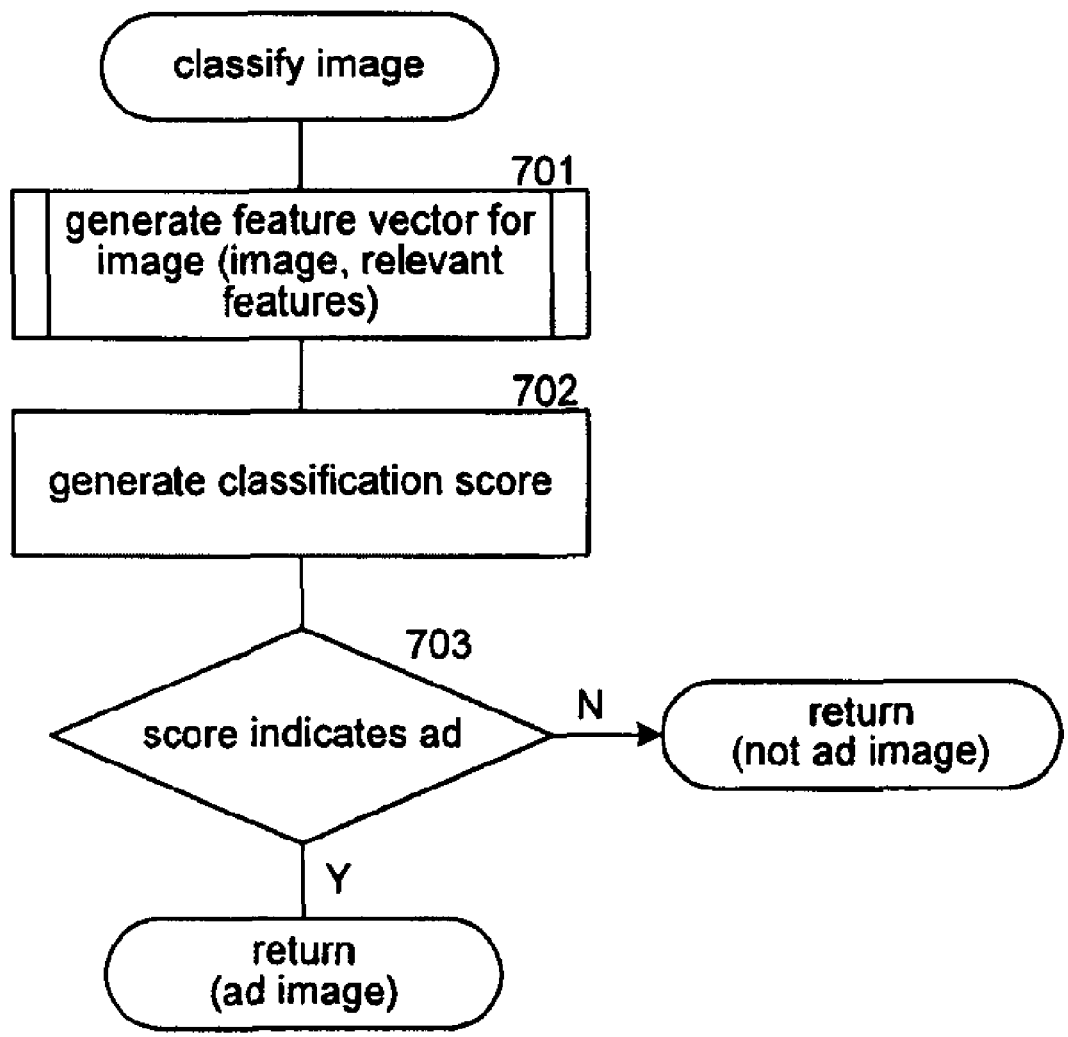
FIG. 7 is a flow diagram that illustrates the processing of the classify image component of the classification system in some embodiments.

FIG. 7 is a flow diagram that illustrates the processing of the classify image component of the classification system in some embodiments. The component is passed a web page that contains an image and returns an indication of whether the image is an advertisement image or a non-advertisement image. In block 701, the component invokes the generate feature vector for image component to generate a feature vector for the image. In block 702, the component generates a classification score by applying the weights of the classification weight store to the features of the feature vector. In decision block 703, if the score indicates that the image is an advertisement, then the component returns an indication of an advertisement image, else the component returns an indication of a non-advertisement image.

Figure 8:
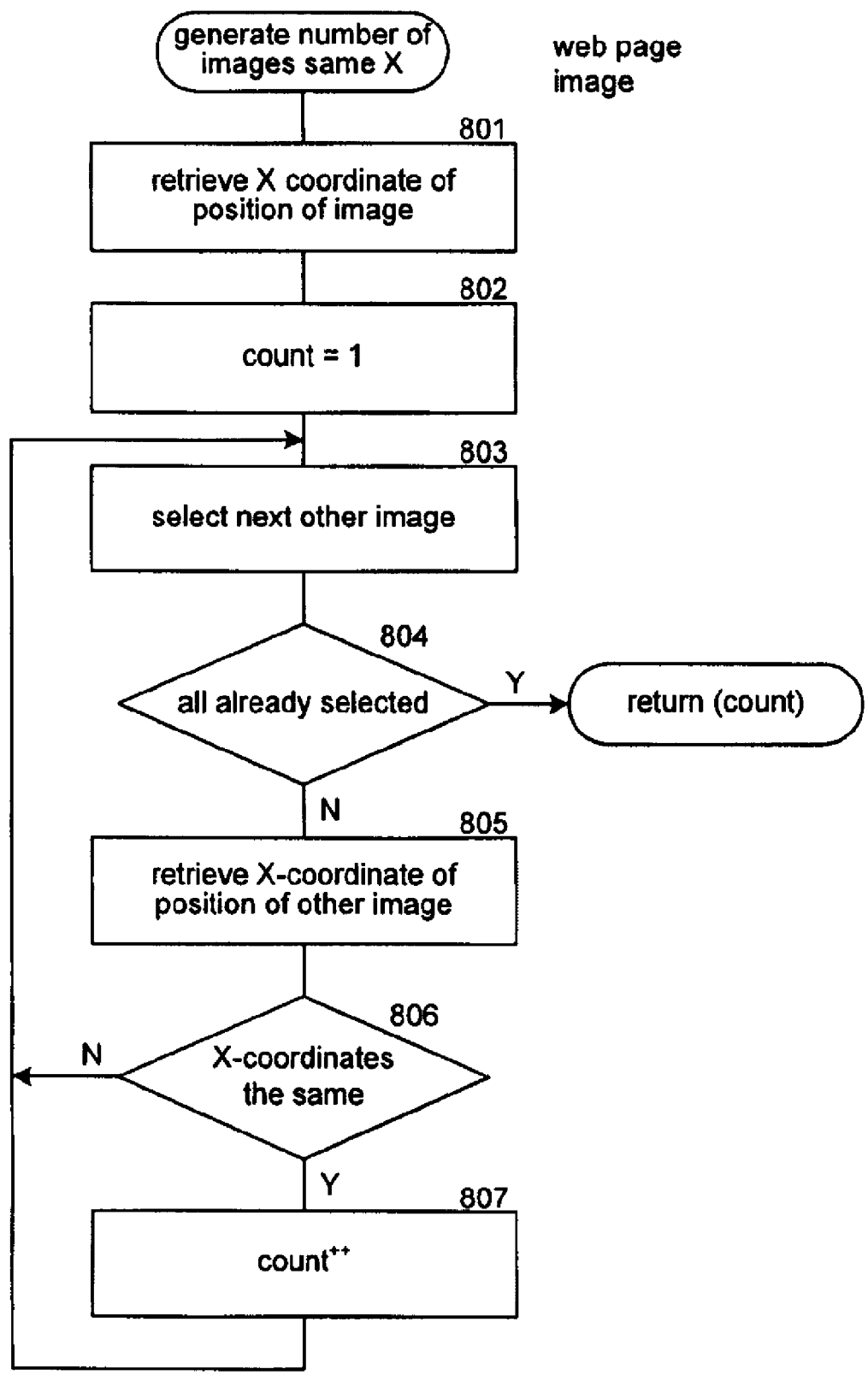
FIG. 8 is a flow diagram that illustrates the processing of a feature generation component of the classification system in some embodiments.

FIG. 8 is a flow diagram that illustrates the processing of a feature generation component of the classification system in some embodiments. In this example, the feature generation component generates the number of images of the web page that have the same leftmost X-coordinate as the image. In block 801, the component retrieves the leftmost X-coordinate of the image. In block 802, the component initializes the count. In blocks 803-807, the component loops determining whether each other image of the web page has the same leftmost X-coordinate. In block 803, the component selects the next other image of the web page. In decision block 804, if all the other images have already been selected, then the component returns the count, else the component continues at block 805. In block 805, the component retrieves the leftmost X-coordinate of the selected other image. In decision block 806, if the X-coordinates are the same, then the component continues at block 807, else the component loops to block 803 to select the next other image. In block 807, the component increments the count and then loops to block 803 to select the next other image.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for generating a classifier to identify advertisement images of display pages, the method comprising:
    providing training display pages, each training display page having one or more training images referenced by the training display page;
    labeling each training image as being an advertisement image or a non-advertisement image;
    generating a feature vector for each of the training images, the feature vector including a visual layout feature derived from the display page that references the training mage and a content feature derived from content of the training image; and
    training a classifier using the feature vectors and labels of the training images to classify a target image of a target display page as an advertisement image or a non-advertisement image based on a feature vector that includes the visual layout feature derived from the target display page and the content feature derived from content of the target image.

2. The method of claim 1 including classifying the target image by:
    generating the feature vector for the target image; and
    applying the trained classifier to the generated feature vector of the target image to classify the target image as an advertisement image or a non-advertisement image.

3. The method of claim 1 including learning relevant features for classifying images as advertisement images and non-advertisement images.

4. The method of claim 3 wherein the learning includes applying an adaptive boosting technique to learn weights of weak classifiers, each weak classifier corresponding to a feature, and selecting as relevant features those features whose weights indicate they are effective at distinguishing advertisement images from non-advertisement images.

5. The method of claim 1 wherein features of an image to include in the feature vectors are learned by training a classifier using candidate features and selecting as relevant features those features that are most heavily weighted by the classifier.

6. The method of claim 1 wherein the feature vector of an image further includes a feature derived from a hyperlink.

7. The method of claim 1 wherein the feature vector of an image further includes a feature derived from text of a display page.

8. A computer-readable storage device for classifying a target image of a target display page as an advertisement image or non-advertisement image, by a method comprising:
    providing a classifier to classify an image of a display page as an advertisement image or a non-advertisement image, the classifier having been trained using features derived from training images of training display pages and labels of the training images, the label of a training image indicating whether the training image is an advertisement image or a non-advertisement image;
    identifying the features of the target image of the target display page; and
    applying the provided classifier to the identified features of the target image to classify the target image as an advertisement image or a non-advertisement image.

9. The computer-readable storage device of claim 8 further comprising:
    providing training display pages, each training display page having one or more training images referenced by the training display page;
    labeling each training image as being an advertisement image or a non-advertisement image;
    identifying features for each of the training images; and
    training the classifier using the identified features and labels of the training images to classify the target image of the target display page as an advertisement image or a non-advertisement image.

10. The computer-readable storage device of claim 9 including learning relevant features for classifying images as advertisement images and non-advertisement images.

11. The computer-readable storage device of claim 10 wherein the learning includes applying an adaptive boosting technique to learn weights of feature-specific weak classifiers and selecting as relevant features those features of weak classifiers whose weights indicate they are effective at distinguishing advertisement images from non-advertisement images.

12. The computer-readable storage device of claim 8 wherein a feature relates to visual layout of a display page.

13. The computer-readable storage device of claim 8 wherein a feature relates to content of an image.

14. The computer-readable storage device of claim 8 wherein a feature relates to text of a display page.

15. The computer-readable storage device of claim 8 wherein a feature relates to a reference on a display page.

16. The computer-readable storage device of claim 8 wherein a first feature and a second feature are selected from the group consisting of visual layout of a display page feature, content of an image feature, text of a display page feature, and a reference of a display page feature, such that the first feature is different from the second feature.

17. A computing device for identifying features of images of web pages for use in classifying images as advertisement images or non-advertisement images, comprising:
    a training data store including feature vectors for images of web pages, the images being labeled as advertisement images or non-advertisement images, the feature vectors including candidate features;
    a memory storing computer-executable instructions of:
        a component that trains a first classifier using the feature vectors with candidate features and labels of the training data store; and
        a component that selects as features for use in classifying images those candidate features whose weights indicate they are effective at distinguishing advertisement images from non-advertisement images; and a processor for executing the computer-executable instructions stored in the memory.

18. The computing device of claim 17 including a component to train a second classifier using feature vectors of the selected features and labels of the training data store.

19. The computing device of claim 18 including a component that classifies an image as an advertisement image or non-advertisement image by generating a feature vector of the selected features for the image and applying the trained second classifier to the generated feature vector of the image.

20. The computing device of claim 19 wherein a first feature and a second feature are selected from the group consisting of visual layout of a display page feature, content of an image feature, text of a display page feature, and a reference of a display page feature, such that the first feature is different from the second feature.

* * * * *